US010234911B2

(12) United States Patent
Chiu (10) Patent No.: US 10,234,911 B2
(45) Date of Patent: Mar. 19, 2019

(54) CHASSIS

(71) Applicants: LITE-ON ELECTRONICS (GUANGZHOU) LIMITED, Guangzhou (CN); Lite-On Technology Corporation, Taipei (TW)

(72) Inventor: Liang-Cheng Chiu, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 15/834,083

(22) Filed: Dec. 7, 2017

(65) Prior Publication Data

US 2019/0011960 A1   Jan. 10, 2019

(30) Foreign Application Priority Data

Jul. 4, 2017   (CN) .......................... 2017 1 0536338

(51) Int. Cl.
*G06F 1/18* (2006.01)
(52) U.S. Cl.
CPC .................................. *G06F 1/182* (2013.01)
(58) Field of Classification Search
CPC ..... H05K 5/0004; H05K 5/0217; G06F 1/182
See application file for complete search history.

(56) References Cited

U.S. PATENT DOCUMENTS

| 6,737,577 | B1 * | 5/2004 | Liao | G06F 1/181 |
| | | | | 174/50 |
| 6,882,527 | B2 * | 4/2005 | Wang | G06F 1/184 |
| | | | | 312/223.2 |
| 7,643,280 | B2 * | 1/2010 | Chen | G11B 33/123 |
| | | | | 361/679.33 |
| 9,189,032 | B2 * | 11/2015 | Jheng | G06F 1/1681 |
| 9,655,273 | B2 * | 5/2017 | Zhou | H05K 7/1487 |
| 9,665,135 | B2 * | 5/2017 | Wong | G06F 1/182 |
| 2004/0184243 | A1 * | 9/2004 | Mease | G06F 1/184 |
| | | | | 361/725 |
| 2005/0068720 | A1 * | 3/2005 | Lambert | G06F 1/184 |
| | | | | 361/679.03 |
| 2005/0105266 | A1 * | 5/2005 | Wang | G06F 1/181 |
| | | | | 361/679.33 |
| 2011/0304983 | A1 * | 12/2011 | Senatori | G06F 1/1616 |
| | | | | 361/679.55 |
| 2012/0217856 | A1 * | 8/2012 | Chen | G06F 1/187 |
| | | | | 312/327 |

FOREIGN PATENT DOCUMENTS

| TW | 566800 | 12/2003 |
| TW | 201422934 | 6/2014 |

* cited by examiner

*Primary Examiner* — Daniel J Rohrhoff
(74) *Attorney, Agent, or Firm* — JCIPRNET (57) ABSTRACT

A chassis including a first casing, a second casing and a friction assembly is provided. The second casing is pivoted to the first casing and includes a track penetrating through the second casing and a first friction portion beside the track. The friction assembly passes through the track and is fixed to the first casing. The friction assembly includes a second friction portion contacting the first friction portion. When the second casing is rotated relative to the first casing, the friction assembly is moved in the track relatively, and the second friction portion rubs against the first friction portion.

11 Claims, 9 Drawing Sheets

CHASSIS

CROSS REFERENCE TO RELATED APPLICATION

This application claims the priority benefit of China application serial no. 201710536338.2, filed on Jul. 4, 2017. The entirety of the above-mentioned patent application is hereby incorporated by reference herein and made a part of specification.

BACKGROUND OF THE INVENTION

1. Field of the Invention

The invention relates to a chassis, and particularly relates to a chassis able to rotate to open or to close.

2. Description of Related Art

Currently, the chassis of some desktop computers may be opened or closed through rotation. In such chassis that is able to rotate and open or close, two casings are normally in pivotal connection, so that one of the casings may be opened or closed relative to the other of the casings. However, how to design a simple, cheap, yet reliable structure in which one of the casings is both rotatable relative to the other of the casings and fixable at an arbitrary position (stepless fixing) or at a predetermined position (stepped fixing) remains an issue to work on.

SUMMARY OF THE INVENTION

The invention provides a chassis with a simple, cheap, yet reliable structure enabling one casing to rotate relative to another casing and to be fixed at a desired position.

A chassis according to an embodiment of the invention includes a first casing, a second casing, and a friction assembly. The second casing is pivoted to the first casing and includes a track penetrating through the second casing and a first friction portion beside the track. The friction assembly passes through the track and is fixed to the first casing. The friction assembly includes a second friction portion contacting the first friction portion. When the second casing is rotated relative to the first casing, the friction assembly is moved in the track relatively, and the second friction portion rubs against the first friction portion.

According to an embodiment of the invention, the friction assembly includes a bushing and a fixing component passing through the bushing, the bushing is fixed to the first casing by the fixing component and includes a central portion and a wing portion extending along a radial direction of the central portion. In addition, the second friction portion is located on the wing portion.

According to an embodiment of the invention, the second casing has an inner surface facing away from the first casing, the first friction portion is located on the inner surface of the second casing, the central portion and the wing portion are located beside the inner surface of the second casing, and the second friction portion faces toward the inner surface of the second casing.

According to an embodiment of the invention, the bushing further includes a connection portion extending along the axial direction of the central portion and a gasket portion connected to the connection portion, the connection portion is located in the track, and the gasket portion is located between the first casing and the second casing.

According to an embodiment of the invention, the track includes a first width and a second width, and the second width is greater than the first width.

According to an embodiment of the invention, the wing portion has a recess or a notch.

According to an embodiment of the invention, the bushing includes a positioning pillar inserted into a positioning hole of the first casing.

According to an embodiment of the invention, the track is in an arc shape, and the first friction portion is disposed along the track to exhibit an arc-shaped profile.

According to an embodiment of the invention, the first friction portion is a protrusion protruding from an inner surface of the second casing or the first friction portion is a rough surface whose roughness is greater than a roughness of the inner surface.

According to an embodiment of the invention, the protrusion has a plurality of heights protruding from the inner surface of the second casing.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1A:
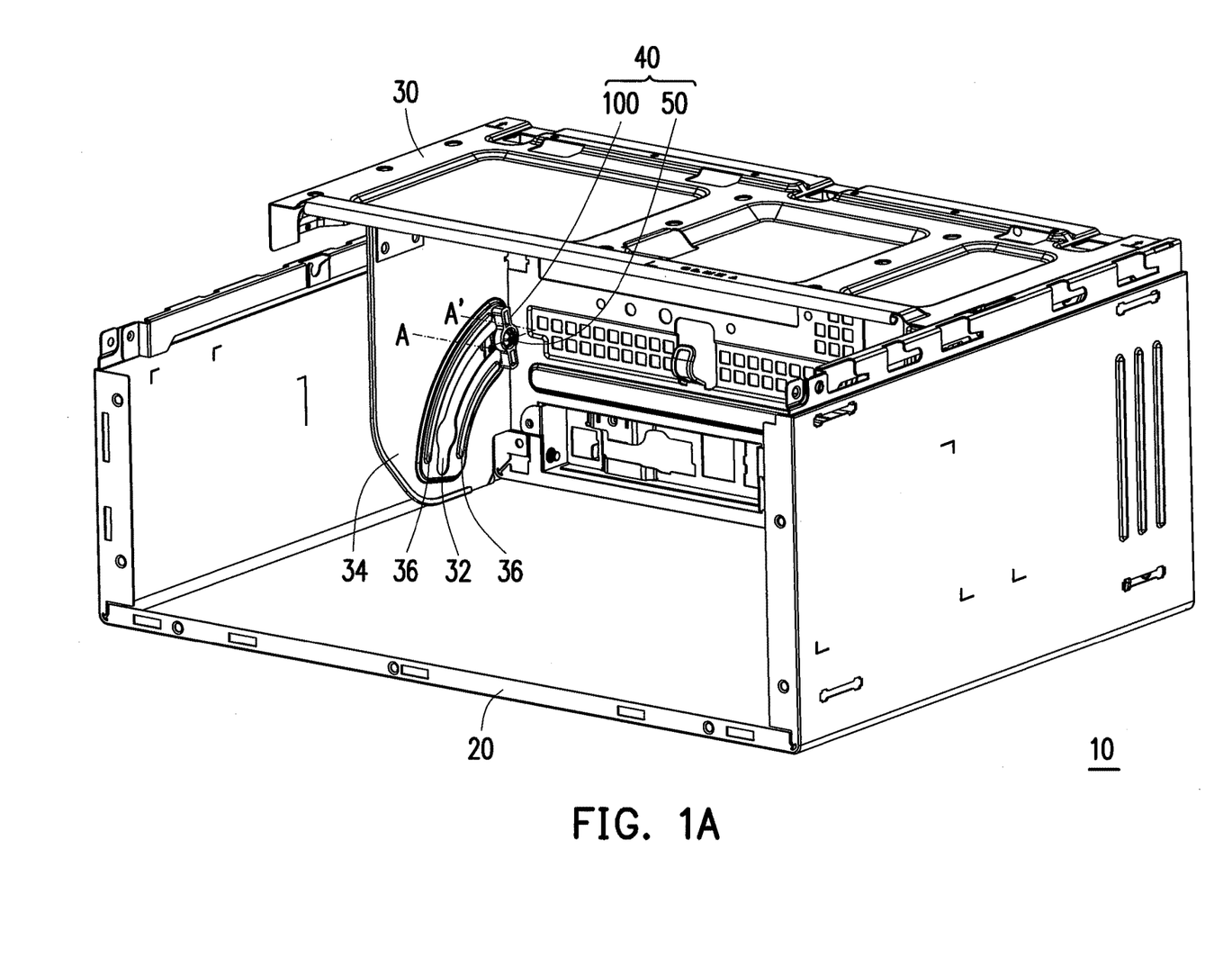
FIG. 1A is a schematic view illustrating that a second casing is closed relative to a first casing in a chassis according to an embodiment of the invention.
Figure 1B:
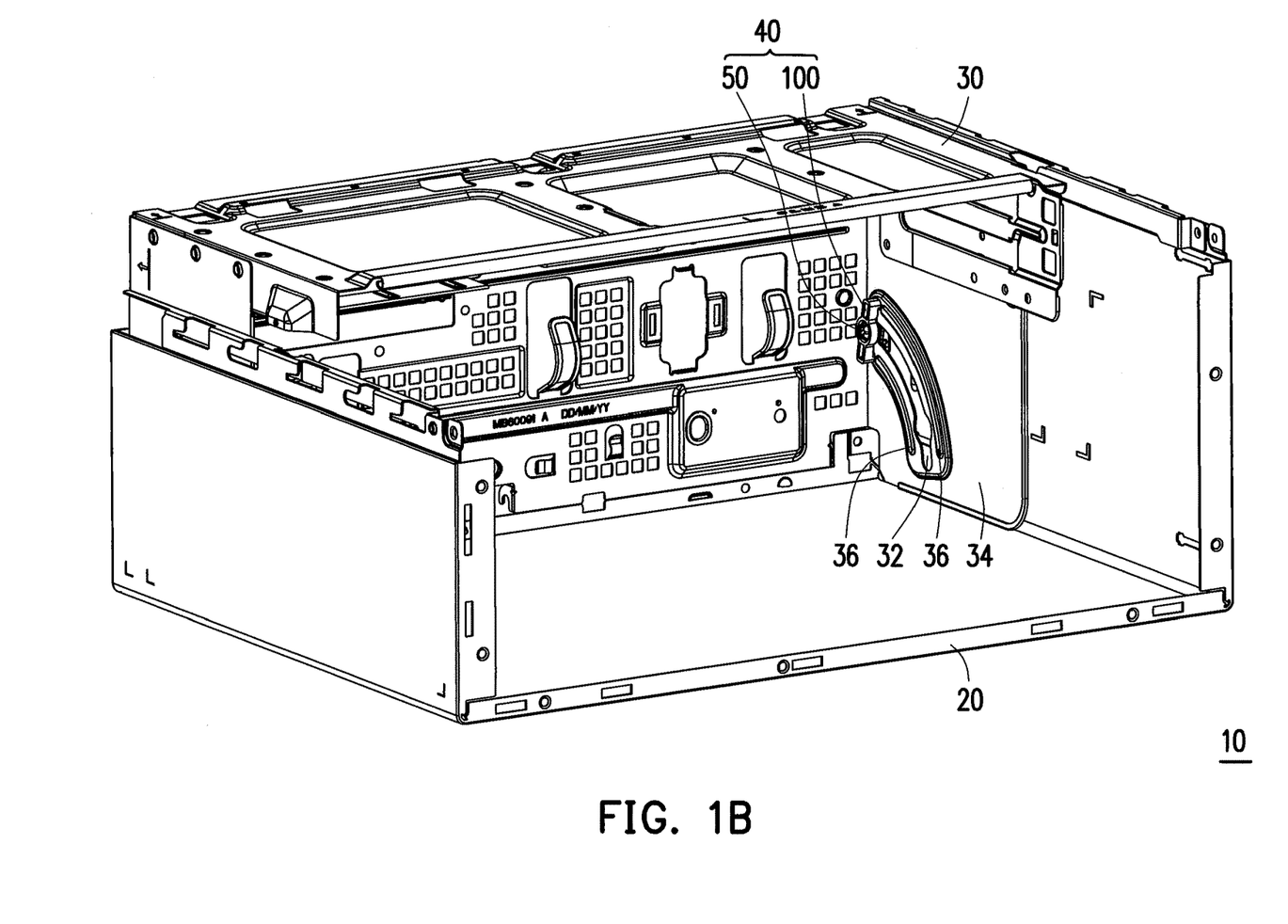
FIG. 1B is a schematic view illustrating the chassis of FIG. 1A from another perspective.
Figure 2:
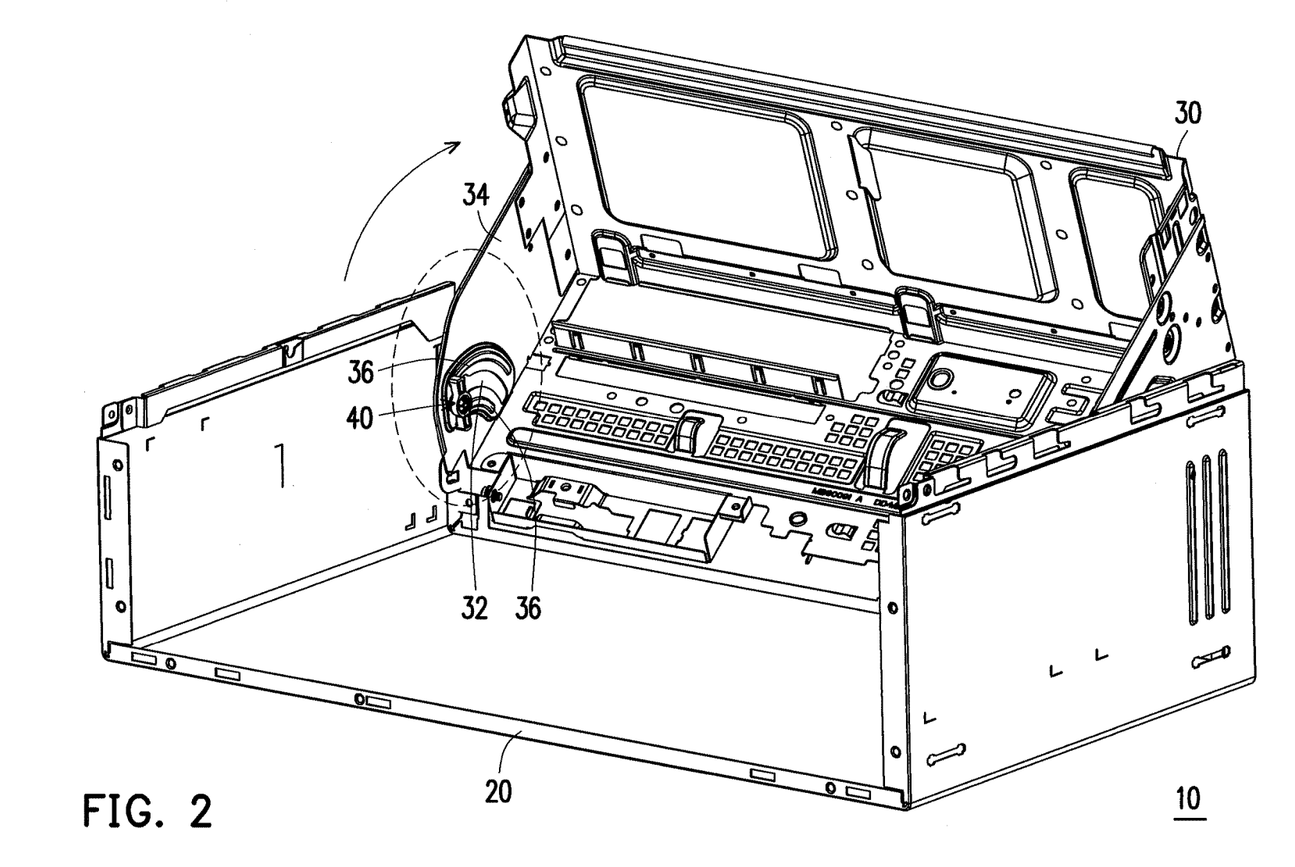
FIG. 2 is a schematic view illustrating that the second casing is opened with respect to the first casing in the chassis of FIG. 1A.

FIG. 1A is a schematic view illustrating that a second casing is closed relative to a first casing in a chassis according to an embodiment of the invention. FIG. 1B is a schematic view illustrating the chassis of FIG. 1A from another perspective. FIG. 2 is a schematic view illustrating that the second casing is opened with respect to the first casing in the chassis of FIG. 1A. Referring to FIGS. 1A, 1B, and 2, a chassis 10 of the embodiment includes a first casing 20, a second casing 30, and a friction assembly 40. The second casing 30 is pivoted to the first casing 20, and may be closed with respect to the first casing 20 as shown in FIG. 1A or opened with respect to the first casing 20 as shown in FIG. 2. In the embodiment, the chassis 10 is described as a computer chassis, for example. The first casing 20 is adapted to accommodate a motherboard (not shown), and the second casing 30 is a tray, for example, and is adapted to accommodate an electronic device such as a hard drive (not shown), an optical disc drive (not shown), or the like. However, the type and use of the chassis 10 and the electronic devices disposed in the chassis 10 are not limited thereto.

In the embodiment, the friction assembly 40 is fixed to the first casing 20 and contacts the second casing 30, and serves to provide a friction resistance when the second casing 30 is pivotally rotated relative to the first casing 20. Accordingly, during the pivotal rotation of the second casing 30 relative to the first casing 20, relative positions between the second casing 30 and the first casing 20 may be fixed in a stepless or stepped manner. Considering FIGS. 1A and 1B together, the chassis 10 may include two friction assemblies 40 respectively located at positions where the first casing 20 and the second casing 30 are pivoted. In the following, the first casing 20, the second casing 30, and the friction assembly 40 shown in FIG. 1A are described.

Figure 3A:
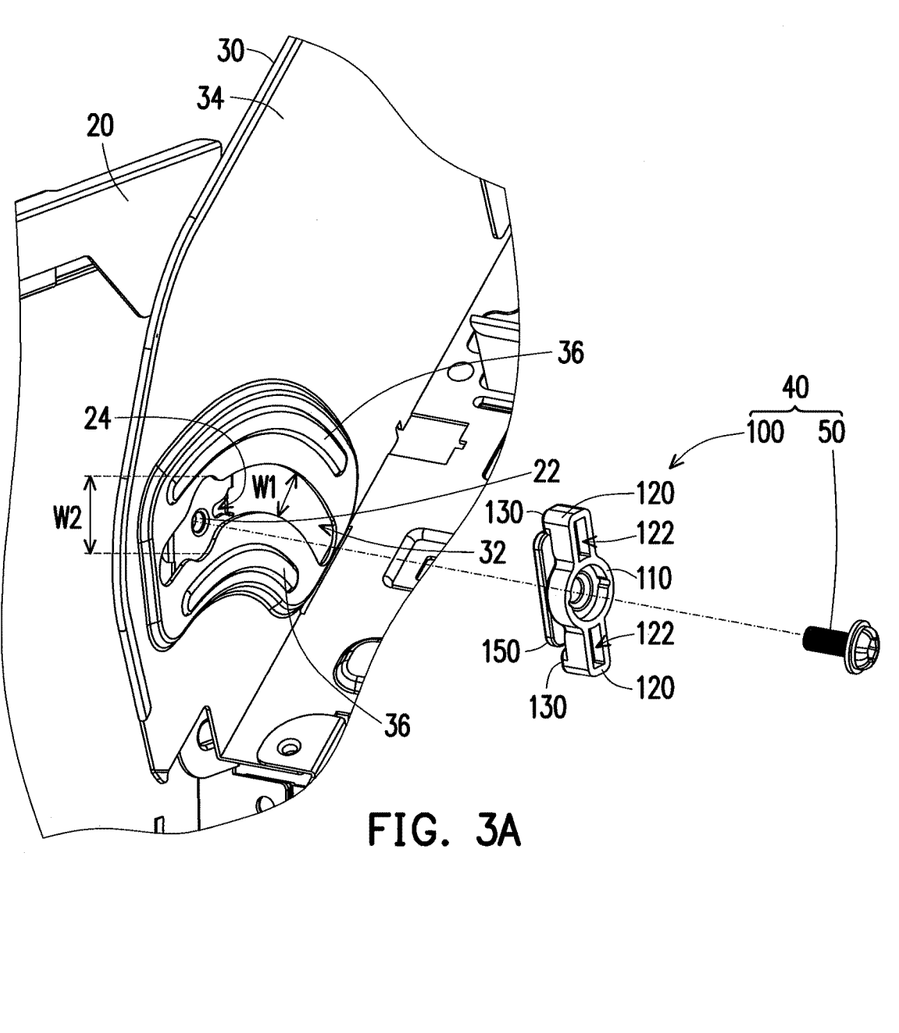
FIG. 3A is a partial schematic view when a friction assembly of FIG. 1A is not yet assembled to the chassis.

FIG. 3A is a partial schematic view when a friction assembly is not yet assembled to the chassis. Referring to FIG. 3A, the second casing 30 has an inner surface 34 facing away from the first casing 20. In addition, the second casing 30 includes a track 32 penetrating through the second casing 30 and at least one first friction portion 36 beside the track 32. Moreover, the first friction portion 36 is located on the inner surface 34 of the second casing 30. In the embodiment, the track 32 is in an arc shape, and the second casing 30 includes two first friction portions 36 located above and below the track 32. The two first friction portions 36 are respectively disposed along the track 32 and exhibit arc-shaped profiles. However, it should be noted that the shape of the track and the number, position, and shape of the first friction portion 36 are not limited thereto. Besides, in the embodiment, the first friction portion 36 is a protrusion protruding from the inner surface 34 of the second casing 30. The protruding first friction portion 36 is able to contact the friction assembly 40 more easily and provides a greater friction force. However, in other embodiments, the first friction portion 36 may also be a rough surface (not shown) whose roughness is greater than a roughness of the inner surface 34, so as to provide a greater friction force to the friction assembly 40.

The friction assembly 40 includes a bushing 100 and a fixing component 50. In the embodiment, the fixing component 50 is a screw, and the bushing 100 is a plastic component, for example. The fixing component 50 may pass through the bushing 100, and the first casing 20 is provided with a screw hole 22 at a corresponding position. In other words, the bushing 100 is fixed to the first casing 20 through locking by the fixing component 50. Of course, in other embodiments, the fixing component 50 may also be a rivet, a solder, an adhesive, or the like, and the bushing 100 may be fixed to the first casing 20 by riveting, soldering, adhering, or the like. The material of the bushing 100, the type of the fixing component 50, and the way of fixing the bushing 100 to the first casing 20 are not limited to the above.

Figure 3B:
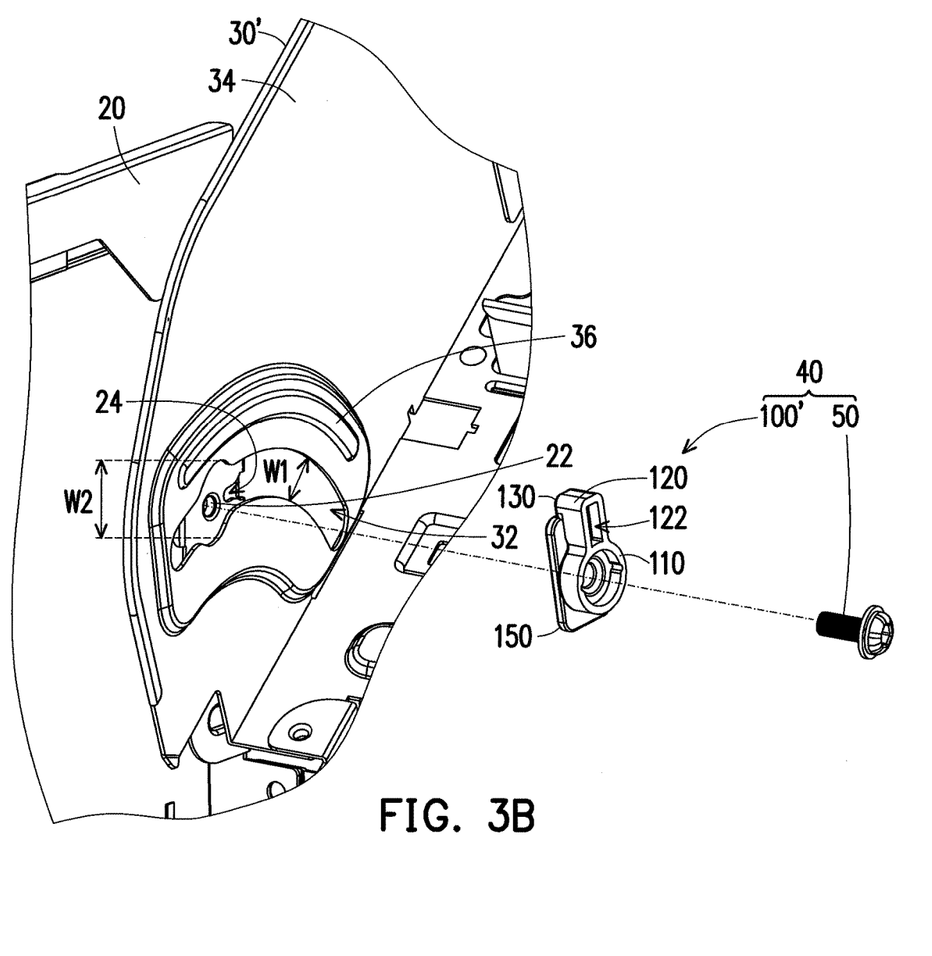
FIG. 3B is a partial schematic view when a friction assembly according to another embodiment of the invention is not yet assembled to the chassis.
Figure 4:
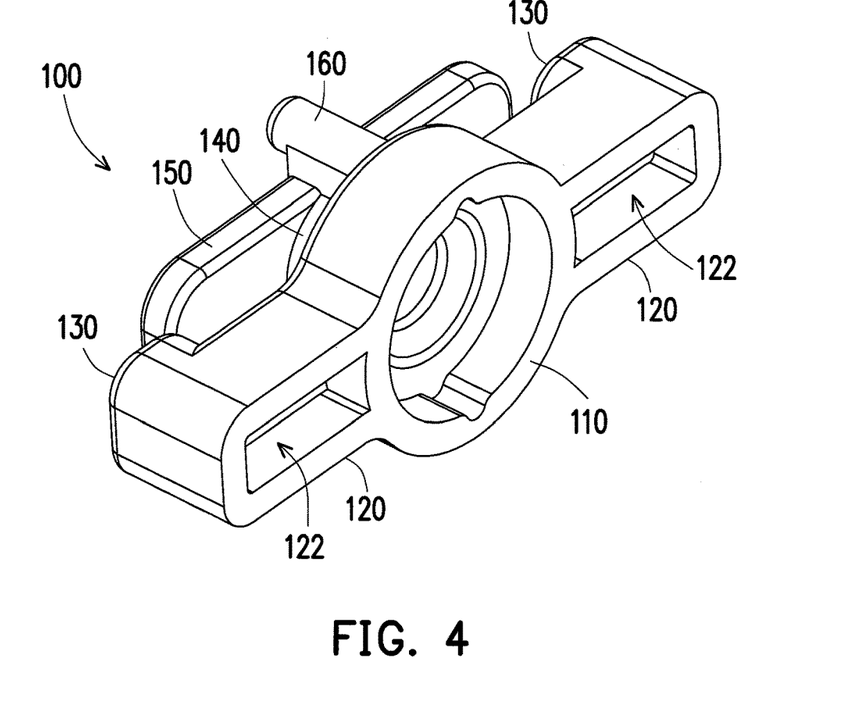
FIGS. 4 to 5 are schematic views illustrating the friction assembly of the chassis of FIG. 1A from different perspectives.
Figure 5:
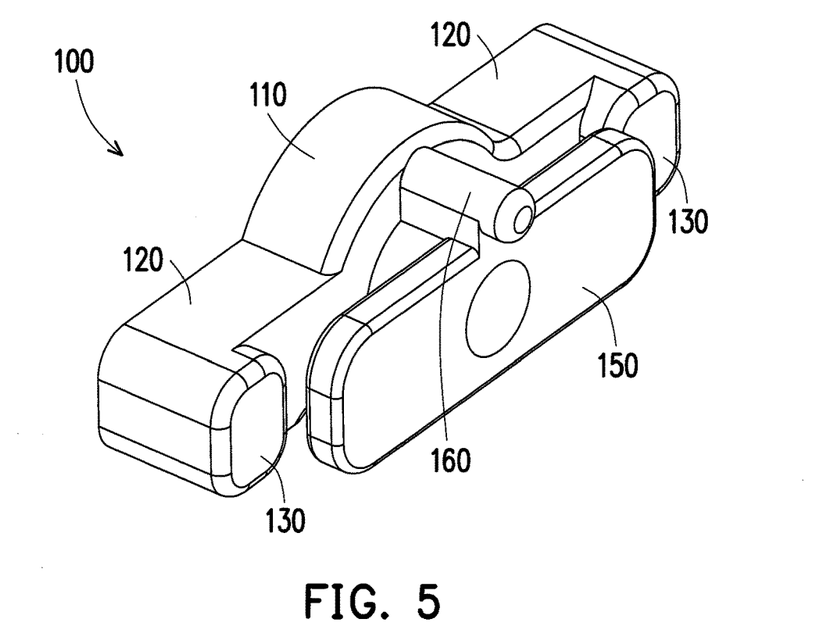

FIGS. 4 to 5 are schematic views illustrating the friction assembly of the chassis of FIG. 1 from different perspectives. Referring to FIGS. 4 to 5, in the embodiment, the bushing 100 includes a central portion 110, at least one wing portion 120 extending along an radial direction of the central portion 110 (wherein two wing portions 120 extending from the central portion 110 in opposite directions are illustrated in the embodiment), a connection portion 140 (FIG. 4) extending along the axial direction of the central portion 110, a gasket portion 150 connected to the connection portion 140, at least one second friction portion 130 contacting the first friction portion 36 (two second friction portions 130 are illustrated in the embodiment) and a positioning pillar 160 extending along the axial direction of the central portion 110 and exceeding the gasket portion 150. As shown in FIG. 5, a length of the gasket portion 150 is less than a total length of the central portion 110 and the two wing portions 120. In addition, the two second friction portions 130 are formed at positions where the two wing portions 120 exceed the gasket portion 150. It should be noted that while the bushing 100 in FIGS. 3A, 4, and 5 include the two wing portions 120 extending from the central portion 110 in opposite directions, the form of the bushing 100 is not limited thereto. FIG. 3B is a partial schematic view when a friction assembly according to another embodiment of the invention is not yet assembled to the chassis. In FIG. 3B, a bushing 100' has only one wing portion 120 extending along the radial direction of the central portion 110, and has only one second friction portion 130 on the wing portion 120. Correspondingly, a second casing 30' has one first friction portion 36 located on a side of the track 32. In other words, the numbers of the wing portion 120, the second friction portion 130, and the first friction portion 36 are not limited to the above.

Back to FIG. 3A, in the embodiment, the track 32 includes a first width W1 and a second width W2 greater than the first width W1. As shown in FIG. 3, a majority of the track 32 is in the first width W1, and the second width W2 is set for the convenience of assembling the bushing 100. More specifically, in the embodiment, the first width W1 is less than the length of the gasket portion 150. The second width W2 is close to the length of the gasket portion 150 but less than the total length of the central portion 110 and the wing portion 120. When assembling the bushing 100, the gasket portion 150 is disposed between the first casing 20 and the second casing 30 by arranging the gasket portion 150 of the bushing 100 to pass through a position of the track 32 in the second width W2. Then, the positioning pillar 160 (shown in FIG. 4) is inserted into a positioning hole 24 of the first casing 20 to align the bushing 100 during assembling of the bushing 100 to the first casing 20. The fixing component 50 then passes through the bushing 100 and is locked to the screw hole 22 of the first casing 20. In the embodiment, the bushing 100 is positioned to the positioning hole 24 via the positioning pillar 160 and is fixed by the fixing component 50. Accordingly, when the bushing 100 slides relative to the track 32, the second friction portion 130 is not rotated but is constantly located at a position contacting the first friction portion 36. In addition, the gasket portion 150 is not rotated, either, and is located at a specific position between the first casing 20 and the second casing 30.

Figure 6:
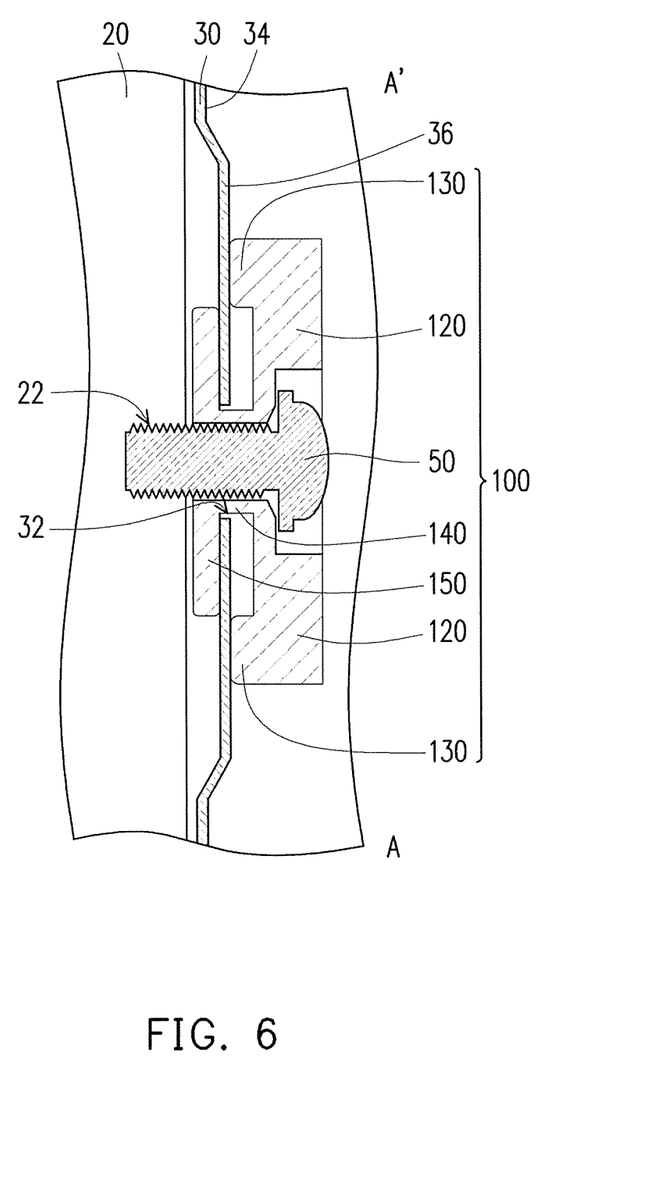
FIG. 6 is a schematic partial cross-sectional view taken along a line A-A' of FIG. 1A.

FIG. 6 is a schematic partial cross-sectional view taken along a line A-A' of FIG. 1. Referring to FIG. 6, in the embodiment, after the bushing 100 is assembled to the first casing 20 and the second casing 30, the central portion 110 and the wing portions 120 are located beside the inner surface 34 of the second casing 30, and the second friction portions 130 face toward the inner surface 34 of the second casing 30 and correspond to the first friction portions 36 to rub against the first friction portions 36. The connection portion 140 of the bushing 100 is located in the track 32, and the gasket portion 150 is located between the first casing 20 and the second casing 30. The gasket portion 150 is disposed to prevent the first casing 20 and the second casing 30 from directly rubbing against each other and generating noises during rotation and to avoid scratches produced on the first casing 20 and the second casing 30. In addition, as shown in FIG. 6, after the bushing 100 is assembled to the first casing 20, the gasket portion 150 and the second friction portions 130 are respectively located at two sides of the second casing 30 and closely contact the second casing 30. In other words, the gasket portion 150 and the second friction portions 130 of the bushing 100 fixed to the first casing 20 may tightly sandwich the second casing 30. Thus, even if the fixing component 50 is locked into the first casing 20 deeper or less deep than the illustration of FIG. 6, the bushing 100 still contacts second casing 30 with the gasket portion 150 and the second friction portions 130. Accordingly, it is ensured that a positive force of the gasket portion 150 of the assembled bushing 100 toward the second casing 30 of the chassis remains the same whether the users exert the same or different force on the fixing component 50 when locking the fixing component 50 (for example, people may apply different forces when locking a screw). Positive forces of the second friction portions 130 of the assembled bushing 100 toward the second casing 30 of the chassis are also the same. Thus, the same friction force is provided to the second casing 30. Thus, when the design of the embodiment is adopted, an opening/closing force for opening or closing the second casing 30 relative to the first casing 20 in each chassis 10 can remain the same.

In the chassis 10 of the embodiment, the track 32 penetrating through the second casing 30 and the first friction portions 36 located beside the track 32 are disposed on the second casing 30, the friction assembly 40 passes through the track 32 and is fixed to the second casing 20, and the second friction portions 130 of the friction assembly 40 contact the first friction portions 36 of the second casing 30 to provide a friction force. Accordingly, the second casing 30 can be fixed at a desired position relative to the first casing 20. The friction assembly 40 of the embodiment is a combination of the bushing 100 and the fixing component 50. In other words, the friction force is provided when the second friction portions 130 of the friction assembly 40 contact the first friction portions 36 of the second casing 30. The friction assembly 40 has a simple structure, and is cheap, easy to assemble and reliable.

It should be noted that, if the designer intends to adjust the friction force between the first friction portion 36 and the second friction portion 130, one way is to adjust a structural strength of the wing portion 120. For example, as shown in FIG. 4, in the embodiment, a surface of the wing portion 120 away from the gasket portion 150 has a recess 122. The recess 122 on the wing portion 120 may make the structure of the wing portion 120 softer. When the second friction portion 130 contacts the first friction portion 36, the wing portion 120 may easily be deformed. Thus, when the second friction portion 130 contacts the first friction portion 36, the wing portion 120 may be slightly bent backward (i.e., bent in a direction away from the first friction portion 36 shown in FIG. 3, which direction is shown away from the gasket portion 150 in FIG. 4). Accordingly, a rubbing area is reduced, and thus the friction force between the second friction portion 130 and the first friction portion 36 becomes smaller. In other embodiments, the wing portion 120 may have a notch, a recess, or the like to achieve a similar effect. Alternatively, in other embodiments, the structural strength of the wing portion 120 may be reduced by reducing a cross-sectional area of the wing portion 120 or increasing the length of the wing portion 120, so as to provide a smaller friction force between the second friction portion 130 and the first friction portion 36.

In the same light, if the designer intends to increase the friction force between the second friction portion 130 and the first friction portion 36, the wing portion 120 may be arranged to be less flexible and consequently less deformable by increasing the cross-sectional area of the wing portion 120 or reducing the length of the wing portion 120, for example. Thus, when the second friction portion 130 rubs against the first friction portion 36, the contact area with respect to the first friction portion 36 is maintained to prevent the friction force from being reduced.

Of course, it is also possible to prevent the friction force from being reduced by reducing a height of at least one of the first friction portion 36 and the second friction portion 130 or reducing a roughness of at least one of the first friction portion 36 and the second friction portion 130. In the same light, the friction force may also be increased by increasing the height of at least one of the first friction portion 36 and the second friction portion 130 or increasing the roughness of at least one of the first friction portion 36 and the second friction portion 130. However, the invention is not limited to the above.

Figure 7:
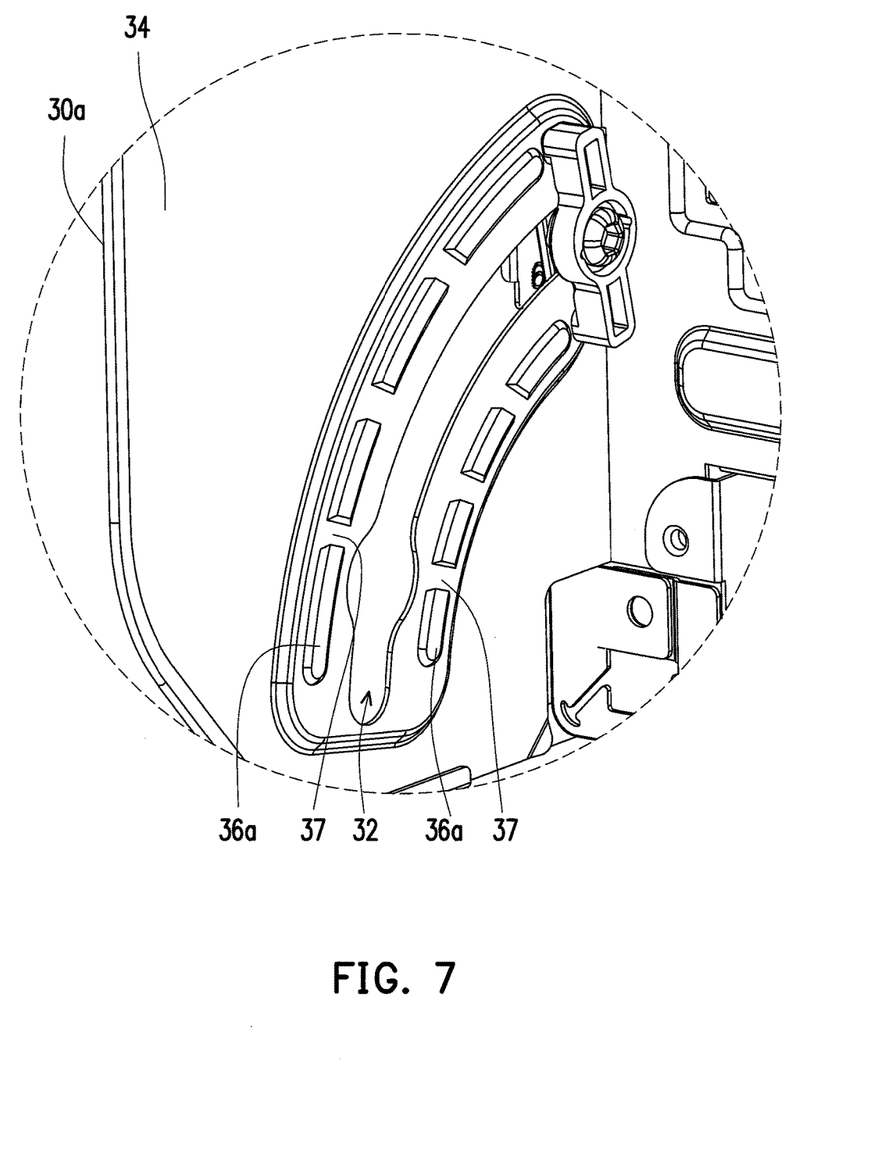
FIGS. 7 to 8 are schematic partially enlarged views illustrating a plurality of second casings of chassis according to other embodiments of the invention.
Figure 8:
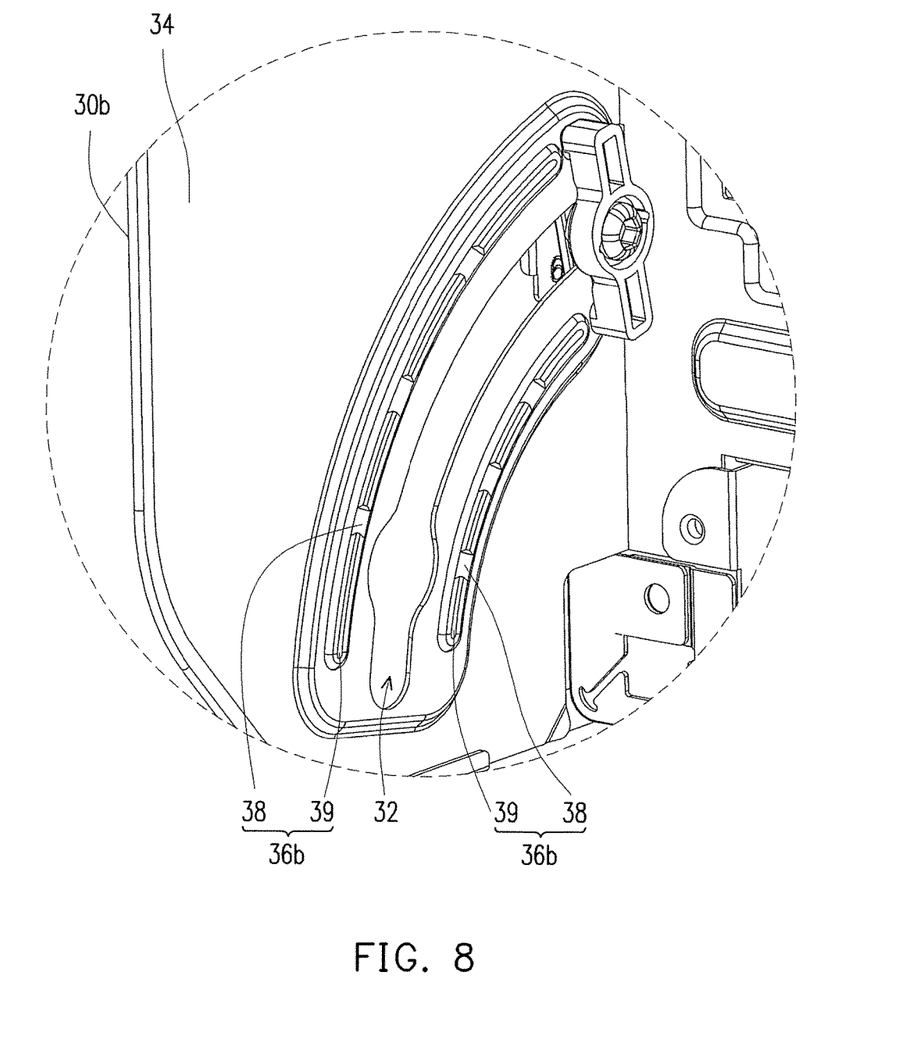

FIGS. 7 to 8 are schematic partially enlarged views illustrating a plurality of second casings of the chassis according to other embodiments of the invention. It should be noted that, in the following embodiments, components the same as or similar to those in the previous embodiments are referred to by the same or similar reference numerals and the descriptions thereof will not be repeated in the following. The following descriptions will only focus on the main difference.

Referring to FIG. 7, the embodiment of FIG. 7 mainly differs from the embodiment of FIG. 1A in that, in FIG. 1A, each first friction portion 36 of the second casing 30 forms an arc, whereas in FIG. 7, a second casing 30a includes a plurality of discontinued first friction portions 36a arranged along the shape of the track 32 to form an arc shape. When the second friction portion 130 (shown in FIG. 3A) rubs against the first friction portion 36a, it is more difficult for the second friction portion 130 to pass therethrough. A greater friction force is thus generated. As a result, the second friction portions 130 may be fixed at such location. On the contrary, when the second friction portion 130 is moved to a recess 37 between two adjacent first friction portions 36a, a smaller friction force is generated. Accordingly, with the discontinued first friction portions 36a and the recesses 37 between the first friction portions 36a, a plurality of stages of rises and falls are provided, thereby enabling stepped fixing of the second casing 30a relative to the first casing 20 (shown in FIG. 3A).

Referring to FIG. 8, the embodiment in FIG. 8 mainly differs from the embodiment of FIG. 1A in that, in FIG. 1A, the first friction portion 36 has a consistent height. In FIG. 8, a first friction portion 36b has a plurality of heights protruding from the inner surface 34 of a second casing 30b. More specifically, in the embodiment, the first friction portion 36b has a plurality of first portions 38 and second portions 39 that are alternately arranged and connected with each other. In addition, a height of the first portion 38 is less than that of the second portion 39 so as to provide two friction strengths. When the second friction portion 130 (shown in FIG. 3A) rubs against the taller second portion 39 of the first friction portion 36b, it is more difficult for the second friction portion 130 to pass therethrough, and a greater friction force is generated. On the contrary, when the second friction portion 130 (shown in FIG. 3A) rubs against the shorter first portion 38 of the first friction portion 36b, it is easier for the second friction portion 130 to pass therethrough, and a smaller friction force is generated. Accordingly, following height variations of the first friction portion 36b, stepped fixing of the second casing 30b relative to the first casing 20 (shown in FIG. 3A) is enabled.

Of course, in other embodiments not shown herein, different friction forces may be provided by adjusting the roughnesses in different areas of the first friction portion, thereby enabling stepped fixing of the second casing 30 relative to the first casing 20. In other words, the ways to provide stepped fixing is not limited to the above.

In view of the foregoing, in the chassis of the embodiments of the invention, the track penetrating through the second casing and the first friction portion beside the track are disposed on the second casing. In addition, the friction assembly passes through the track and is fixed to the first casing. When the second casing is rotated relative to the first casing, the friction assembly is relatively moved in the track. In addition, the second friction portion of the friction assembly rubs against the first friction portion of the second casing to provide a friction force. Accordingly, the second casing may be fixed at a desired position relative to the first casing. The friction assembly of the chassis according to the embodiments of the invention may be a combination of the bushing and the fixing component. The friction assembly has a simple structure, and is cheap, easy to assemble, and reliable.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A chassis, comprising:
a first casing;
a second casing, pivoted to the first casing, and including a first surface and a second surface opposite to the first surface, a track penetrating through the first surface and the second surface and a first friction portion; and
a friction assembly, passing through the track, fixed to the first casing, and including a second friction portion contacting the first friction portion, wherein when the second casing is rotated relative to the first casing, the friction assembly is moved relatively in the track, and the second friction portion rubs against the first friction portion, and
wherein the first friction portion is located on the first surface outside the track.

2. The chassis as claimed in claim 1, wherein the friction assembly comprises a bushing and a fixing component passing through the bushing, the bushing is fixed to the first casing by the fixing component and comprises a central portion and a wing portion extending along a radial direction of the central portion, and the second friction portion is located on the wing portion.

3. The chassis as claimed in claim 2, wherein the first surface is an inner surface of the second casing facing away from the first casing, the central portion and the wing portion are located beside the inner surface of the second casing, and the second friction portion faces toward the inner surface of the second casing.

4. The chassis as claimed in claim 2, wherein the bushing further comprises a connection portion extending along the axial direction of the central portion and a gasket portion connected to the connection portion, the connection portion is located in the track, and the gasket portion is located between the first casing and the second casing.

5. The chassis as claimed in claim 4, wherein the track comprises a first width and a second width, and the second width is greater than the first width.

6. The chassis as claimed in claim 2, wherein the wing portion has a recess or a notch.

7. The chassis as claimed in claim 2, wherein the bushing comprises a positioning pillar inserted into a positioning hole of the first casing.

8. The chassis as claimed in claim 1, wherein the track is in an arc shape, and the first friction portion is disposed along the track to exhibit an arc-shaped profile.

9. The chassis as claimed in claim 1, wherein the first surface is an inner surface of the second casing and the first friction portion is a protrusion protruding from the inner surface of the second casing or the first friction portion is a rough surface whose roughness is greater than a roughness of the inner surface.

10. The chassis as claimed in claim 1, wherein the first surface is an inner surface of the second casing and the first friction portion is a protrusion protruding from the inner surface of the second casing and wherein the protrusion has a plurality of heights protruding from the inner surface of the second casing.

11. The chassis as claimed in claim 1, wherein the first friction portion is located near the track.

* * * * *